United States Patent
Kahn

(10) Patent No.: US 6,680,753 B2
(45) Date of Patent: Jan. 20, 2004

(54) METHOD AND APPARATUS FOR SKIPPING AND REPEATING AUDIO FRAMES

(75) Inventor: Michael Kahn, Westampton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 421 days.

(21) Appl. No.: 09/800,565

(22) Filed: Mar. 7, 2001

(65) Prior Publication Data

US 2002/0128822 A1 Sep. 12, 2002

(51) Int. Cl.$^7$ ................................................. H04N 9/475

(52) U.S. Cl. .................................... 348/512; 375/240.28

(58) Field of Search ................................. 348/512, 515, 348/192; 375/240.28; 370/503, 542; 386/54, 100; 704/500, 502

(56) References Cited

U.S. PATENT DOCUMENTS 5,949,410 A * 9/1999 Fung .......................... 345/302

* cited by examiner

Primary Examiner—Victor R. Kostak
(74) Attorney, Agent, or Firm—RatnerPrestia

(57) ABSTRACT

A method of synchronizing audio frame presentation time with a system time in an MPEG audio bit-stream decoder is provided. The method includes identifying a time disparity between an audio frame presentation time and a system time. A group of successive audio frames in the MPEG audio bit stream are then examined for an audio frame having an amplitude value less than a threshold value. An audio frame is selected from the examined bit stream for skipping or repeating. If an audio frame below the threshold value is identified, it is selected, otherwise the last frame in the group of frames is selected. The selected frame is then skipped or repeated to synchronize the audio presentation time to the system time in order to minimize the effect of audio artifacts on the listener.

19 Claims, 2 Drawing Sheets

METHOD AND APPARATUS FOR SKIPPING AND REPEATING AUDIO FRAMES

The present invention relates, in general, to a method of processing a compressed audio signal. More particularly, this invention provides a method for skipping and repeating audio frames of an MPEG audio bit stream to synchronize the audio presentation time with the system time.

BACKGROUND OF THE INVENTION

Presently, audio decoder systems for decoding an MPEG audio bit stream such as that specified, ISO/IEC 13818-1 (Information technology—Generic coding of moving pictures and associated audio information: Systems reference number ISO/IEC 13818-1:1996(E)) provides a means for conveying information needed to synchronize audio presentation units (audio frames) to a system time. As can be appreciated, the synchronization of audio frames to the system time ensures that compressed audio frames are decoded and presented at the same time as their corresponding video frames. Depending on the particular program content and the particular decoding hardware and/or software that is being used, the corresponding audio and video portions of a television program may not be decoded at the same time and, so, the audio and video portions may fall out of synchronization. This lack of synchronization may be detected as a disparity between the presentation time of an audio frame and the system time.

In order to synchronize digital audio a process of repeating or skipping audio frames is employed. For example, if the audio frame presentation time is lagging behind the system time, it may be necessary to skip audio frames to re-synchronize the audio presentation time with the system time. If the audio frame presentation time is leading the system time, it may be necessary to repeat audio frames to likewise re-synchronize the audio presentation time with the system time.

Presently, audio decoders skip or repeat audio frames as needed. Thus, when the audio presentation time is not synchronized to the system time the next audio frame is skipped or repeated. Depending on the audio signal that is being presented, skipping or repeating an audio frame may be unduly distracting to the listener. If, for example, an audio frame in a loud segment of the program is skipped or repeated, it may create a noticeable audio artifact.

Accordingly, there is a need for an audio processing technique for reducing the audible effects of skipping and repeating audio frames.

SUMMARY OF THE INVENTION

The present invention is embodied in a method for synchronizing an audio frame presentation time with a system time in an audio decoder that receives a sequence of audio frames. The method first identifies a time disparity between the system time and the presentation time for one of the audio frames. Responsive to the identified disparity, the method identifies at least one audio frame in the sequence of audio frames having an amplitude value that is less than a threshold amplitude value and processes the identified audio frame to reduce the identified disparity between the audio frame presentation time and the system time.

It is to be understood that both the foregoing general description of the invention and the following detailed description are exemplary, but are not restrictive, of the invention.

BRIEF DESCRIPTION OF THE DRAWINGS

The invention is best understood from the following detailed description when read in conjunction with the accompanying drawings.

DETAILED DESCRIPTION OF THE INVENTION

Certain terminology used in the following description is for convenience only and is not limiting. The term "system time" is generally defined as referring to the system clock signal and corresponding system time values generated from, for example, the elementary stream clock reference (ESCR) of an MPEG signal. Although the subject invention is described in terms of an MPEG audio decoder, it is contemplated that it may be practiced with other encoded audio streams in which audio frames or packets include presentation time values that are to be synchronized to a system clock value.

The MPEG standard provides presentation timestamps periodically in the audio bit-stream. These timestamps define times at which their corresponding audio frames are to be presented in order for the audio portion of the program to be synchronized with the video portion. The audio presentation timestamps are referenced to the system time values.

As set forth in the Systems Section of the MPEG standard, synchronization among multiple elementary streams that constitute a television program (e.g. audio, video and data) is accomplished by periodically providing time stamps in the data stream. The MPEG standard provides for two types of timestamps in the data stream, program clock reference (PCR) timestamps and presentation timestamps. The PCR timestamps define the 27 MHz system clock signal that is used by the decoder. The PCR timestamps may be, for example, ESCR values contained in the transport packets for the audio program and, thus, are provided to the audio decoder by the transport decoder (not shown). The PCR timestamps are used to generate the system time values.

The presentation timestamps specify when, according to the system time, a particular audio or video frame is to be presented to the viewer. Thus, the decoding of the elementary streams is synchronized by adjusting the decoding of each of the streams to a common master time base rather than by adjusting the decoding of one stream to match that of another. The master time base may be the clock signal of the audio or video decoder, a clock signal derived from the data source, or it may be an externally supplied clock signal. The PCR values define the value of the system time for this clock signal at predetermined intervals and, so, allow the receiver to synchronize the local clock signal to the bit stream and, so, establish the local clock signal as the system clock signal.

One type of presentation timestamp that is provided in the audio bit-stream is an audio frame timecode. This value is an optional value that may occur in the bit-stream information (BSI) section of the frame. The timecode value defines the presentation time of a particular sample in the frame to an accuracy of 33 ms.

Figure 1:
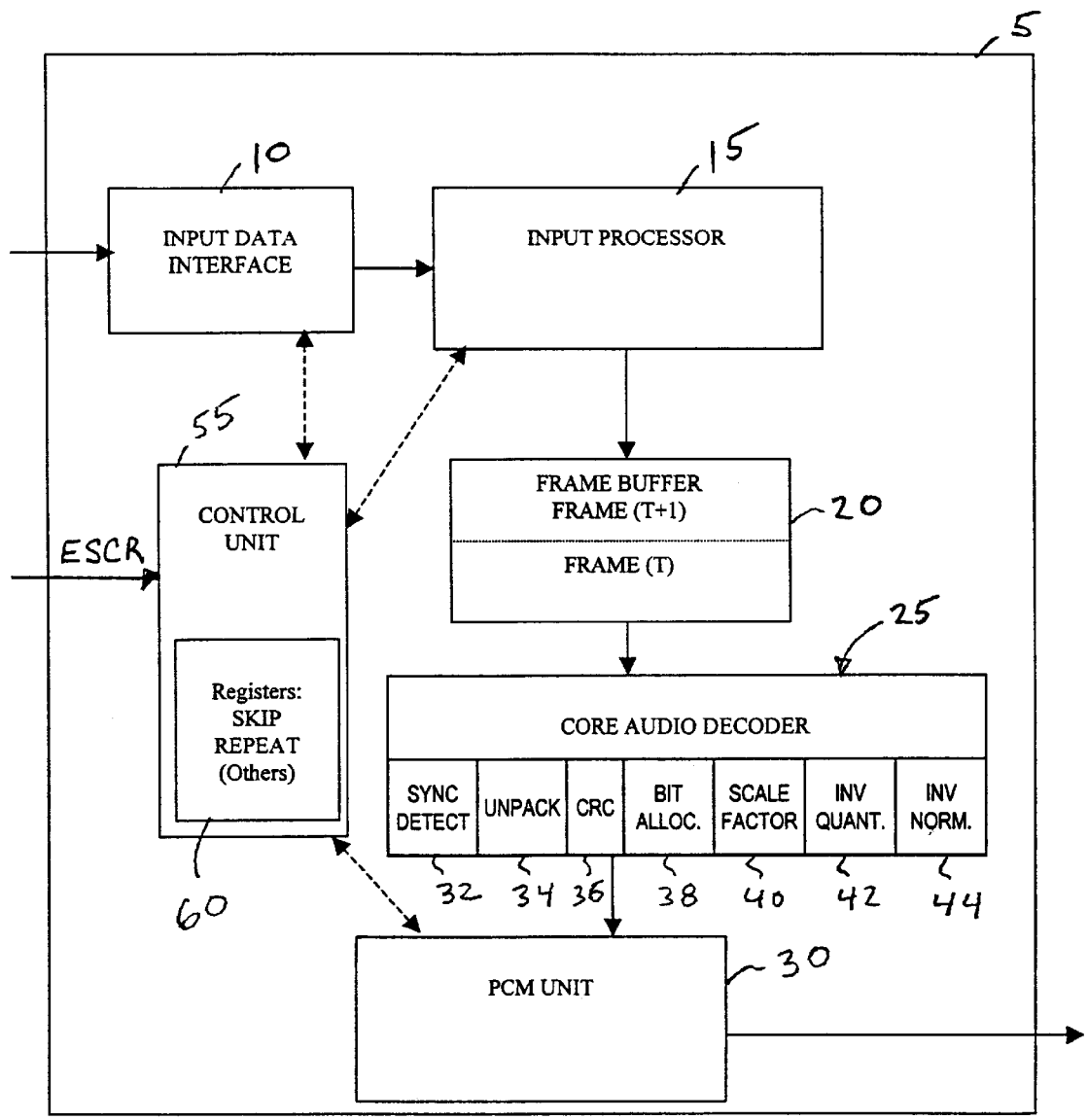
FIG. 1 is a high level block diagram of a typical audio decoder system.

A typical audio decoder system 5 as shown in FIG. 1 includes an input data interface 10, an input processor 15, a control unit 55, a "frame buffer" or memory 20, a core audio decoder 25 and a PCM unit 30.

In operation, an MPEG audio bit stream is fed into the input data interface 10. The MPEG bit stream data is then transferred to the input processor 15. The input processor 15 unpacks the bit stream into individual MPEG audio frames.

As known to those skilled in the art, an MPEG-coded audio frame includes a header portion, followed by the audio data and then by a cyclic redundancy code (CRC) word. The header information includes a synchronization pattern or sync-word portion, and a bit stream information (BSI) portion. The BSI includes parameters that describe how the audio signals are encoded and also includes the optional frame timecode. The CRC word is used to detect errors in the transmitted MPEG frame.

The unpacked MPEG audio frames are then fed to the frame buffer 20. The frame buffer 20 typically holds two frames. In this way, the input processor 15 may load a next frame (frame T+1) into buffer 20, while the core audio decoder 25 removes the current frame (frame T) from the frame buffer 20. The core audio decoder 25 decompresses the compressed MPEG audio frame, and sends the results to the PCM unit 30 which produces the analog audio output signal. Details on the structure and operation of an exemplary core audio decoder 25 may be found in sections 1.3 and 6 of a publication entitled *Digital Audio Compression Standard* (AC3) which is available from the Advanced Television Systems Committee.

MPEG Audio Decoder

The core audio decoder 25 typically includes a synchronization detector 32, a frame unpacking circuit 34, a CRC detector 36, a bit allocation decoder 38, a scale-factor decoder 40, an inverse quantizer 42, and an inverse normalizer 44.

The synchronization detector 32 detects the synchronization pattern in the frame headers of the input bit stream to ensure that the bit stream has been properly decoded. The synchronization pattern is a 16-bit word that has a low probability of false detection. When the synchronization detector indicates that an audio frame synchronization word has been detected, the decoder is properly synchronized to the clock signal and the CRC word for the audio frame may be checked to determine if transmission errors have occurred.

The frame unpacking circuit 34 separates the header information including, bit allocation information, scale-factor information, bit rate, sampling frequency, number of channels, and other such information from the frame. It also separates the sample data and CRC word from the bit stream. The frame unpacking circuit 34 sets the information in the header as parameter data for further use in the decoding processes.

The CRC detector 36 calculates the CRC word for the data in the frame and checks the calculated code against the CRC at the end of the frame. If the calculated CRC code does not match the received CRC code then the data has been corrupted and will not produce valid audio signals. In this instance, the CRC detector 36 performs dropout compensation and, for example, mutes the audio during the frame time.

The bit allocation decoder 38 decodes the bit allocation information and determines the number of bits in the mantissa and, thus, the quantization resolution of each audio sample in the data (MPEG Layer 1) The exponent values corresponding to each mantissa are five-bit values. The exponent values may be considered to be scale factors that multiply the mantissa values by $2^{scale\ factor}$.

The inverse quantizer 42 reverses the coefficient quantization operation that was applied to the mantissas of the frequency domain coefficients at by the encoder, to provide dequantized coefficient values. The quantized mantissas are provided to the inverse quantizer 42, which selects predetermined values according to output of the bit allocation decoder 38, and performs the dequantization operation.

The inverse normalizer 44 obtains denormalized mantissa values from the dequantized mantissa values by multiplying the dequantized mantissas by factors of two raised to the exponent values obtained from the scale-factor decoder 40. The resultant values are dequantized and denormalized frequency domain coefficients to be passed to the PCM unit 30.

The PCM unit 30 applies an inverse frequency transform operation to the dequantized and denormalized coefficients to produce a Pulse Code Modulated (PCM) analog output signal. This signal is applied to a digital to analog converter (DAC) that converts the time-domain PCM digital samples into one or more analog output signals, one for each audio channel.

The control unit 55 orchestrates data flow among the various elements (indicated via dashed lines). No audio data is written to the control unit 55. Control unit 55 receives an elementary system clock reference (ESCR) or "system time" from a transport decoder of the audio device (not shown). The ESCR serves as the system clock reference.

The audio presentation time of each audio frame is determined by the timecode values for the frame when they are present. As described above, not all audio frames include timecode values. Frames that include timecode values specify the time at which a specified audio sample in the frame should occur to an accuracy of 33 ms. If the normal decoding process can not present the specified analog sample at the time indicated by the timecode then the decoding process is adjusted by skipping audio frames (if the timecode value lags or is too far behind the system clock) or repeating audio frames (if the timecode value leads or is too far ahead of the system clock).

In the exemplary embodiment of the invention, the control unit 55 monitors the timecode values for audio frames that have timecodes for disparities between the timecode values and the system clock that are greater than a threshold amount of time, for example, one audio frame time. The control unit 55 also provides a mechanism for controlling the processing of the individual frames in order to resynchronize the audio output signal with the system clock. In the exemplary embodiment of the invention, this processing involves skipping or repeating selected audio frames. The exemplary control unit 55 includes skip and repeat registers among registers 60 for skipping or repeating a selected audio frame of the MPEG bit stream in order to synchronize the audio frame presentation time with the system time while minimizing audible artifacts that may be caused when the particular frame that is selected is skipped or repeated.

Figure 2:
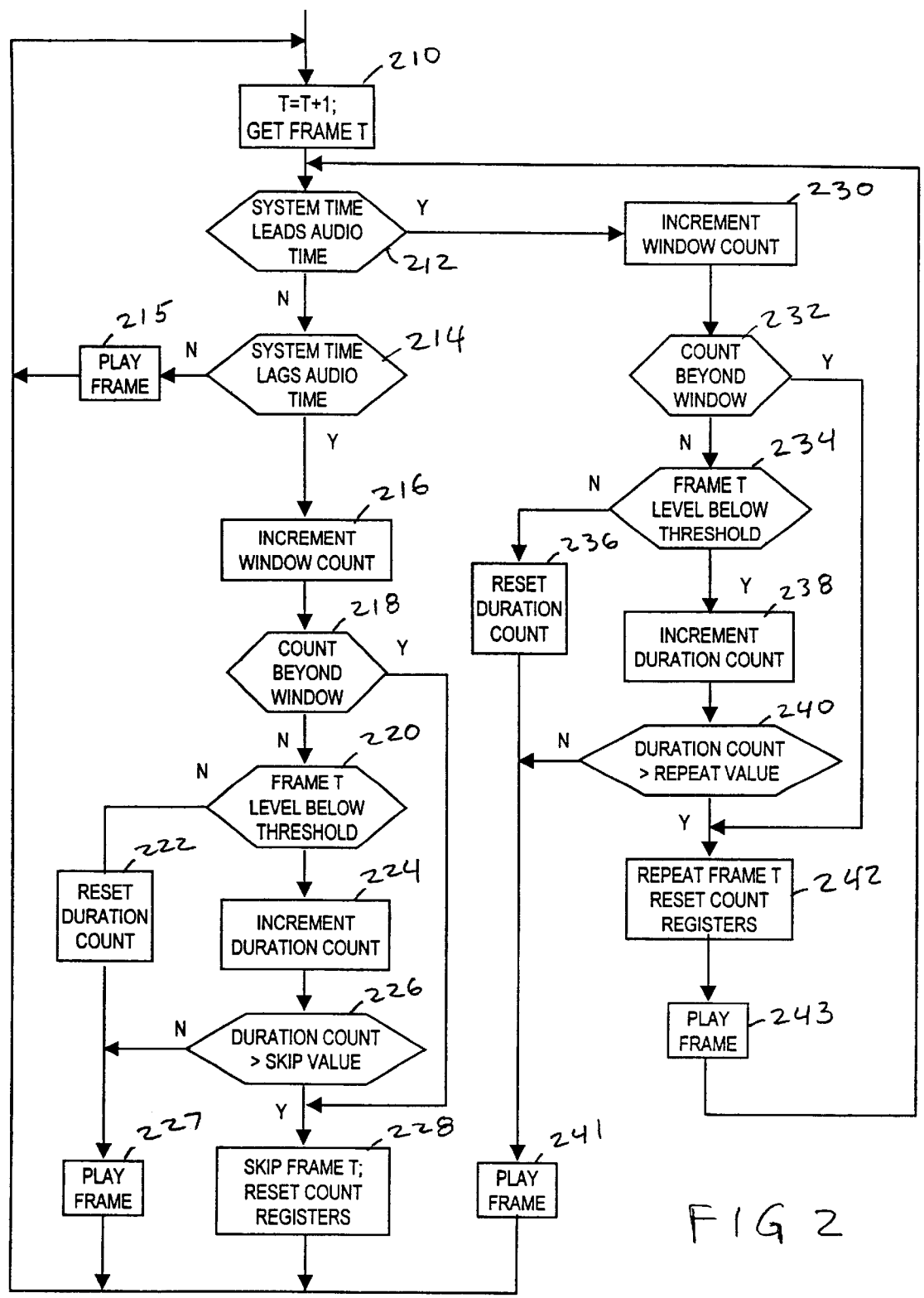
FIG. 2 is a flow diagram of a method of skipping and repeating audio frames in accordance with the present invention.

As shown in the flow chart of FIG. 2, a method in accordance with the present invention is provided to reduce the noticeable effects of skipping and repeating by attempting to skip/repeat frames having audio signals of limited magnitude, instead of skipping/repeating an arbitrary frame of an MPEG bit stream.

In one exemplary embodiment, the invention is implemented in hardware in the MPEG audio decoder 5 such as shown in FIG. 1. In another embodiment, the invention is implemented in computer software running on a computer. For this embodiment, the computer software may be on a computer readable carrier such as an integrated circuit, magnetic card medium, magnetic or optical disk, or a radio-frequency or audio frequency carrier wave.

The audio decoder employs the registers 60 of control unit 55 to provide parameters that are used by the invention. The following registers 60 may exist in the control unit 55 of the audio decoder 5:

REQ_TO_SKIP: (Request to Skip) writing to this register of control unit 55 causes the audio decoder 5 to look for a good audio frame to skip, according to the subject invention. Once the frame has been skipped, this register is automatically cleared.

REQ_TO_REP (Request to Repeat) writing to this register of control unit 55 causes the audio decoder 5 to look for a good frame to repeat, according to the subject invention Once the frame has been repeated, this register is automatically cleared.

SEARCH_WINDOW (Search Window) This register is incremented for each frame that is considered for skipping or repeating after the disparity has been detected.

SEARCH_WINDOW_MAX (Maximum Search Window size) This register of control unit 55 is written with the value corresponding to the maximum number of audio frames the audio decoder 5 will examine before skipping/repeating the audio frame regardless of the audio volume level. Once a disparity between the presentation time for a frame and the system time has been detected, the value stored in the register SEARCH_WINDOW defines the group of frames that are to be searched to identify the frame that is to be skipped or repeated.

THRESHOLD (Threshold) This register of control unit 55 is written with the digital value corresponding to a level at or below which the frame is considered to be a candidate for skipping/repeating.

DURATION (Duration) This register of control unit 55 contains a number of consecutive quiet frames that must occur before a frame is skipped or repeated, including the frame that is skipped or repeated.

In addition, internal values, AUDIO VOLUME, SKIP_VALUE and REPEAT_VALUE are included in the registers 60. The VOLUME value represents a peak PCM value of the current frame (frame T). The SKIP_VALUE represents a number of consecutive audio frames having AUDIO VOLUMEs less than the THRESHOLD that are to be processed to skip a frame. This number includes the frame to be skipped. The REPEAT_VALUE represents the same value for frames to be repeated. Although the exemplary embodiment uses the peak amplitude value of the audio samples in a PCM frame as an indication of the frame amplitude, it is contemplated that other measures may be used, for example, average amplitude value, root-mean square (RMS) amplitude value or a percentage amplitude value (e.g. 90 percent) generated, for example, by a histogramming function (not shown) applied to the decoded audio samples.

Adjusting Lagging System Time

Referring now to the flow chart of FIG. 2 the method in accordance with the present invention is shown. In step 210 the frame index T is incremented and next frame is obtained from the frame buffer 20. At step 212, the control unit 55 compares the current time value of the system clock to the audio presentation time, as determined by the core audio decoder 25 to determine if the system time leads (i.e. is greater than) the presentation time by more than a frame duration. If the system time does not lead the audio presentation time (i.e., system time does not require a repeated frame) the method continues to step 214 otherwise the method branches to step 232 (described below at Adjusting Leading System Time). At step 214, the control unit 55 again compares the current value of the system clock to the audio presentation time to determine if the system time lags (i.e. is less than) the presentation time by more than a frame duration. If the system time does not lead or lag the audio presentation time, the method plays the frame at step 215 and returns to step 210 to obtain the next frame. If, however, at step 214, the system time is determined to be lagging behind the audio time, the SEARCH WINDOW count value is incremented at step 216.

At step 218, it is determined if the SEARCH_WINDOW count value has exceeded SEARCH_WINDOW_MAX. If so, control passes to step 228 and the frame T is skipped to synchronize the audio presentation time to the system time by reducing the difference between the presentation time and the system time to less than one frame duration. If at step 218, the count value is determined to be less than or equal to the SEARCH WINDOW value, the method continues to step 220. At step 220, the peak amplitude level of frame T (as obtained from the register VOLUME) is compared to a threshold value THRESHOLD. If at step 220, the peak amplitude value of frame T is not less than the value THRESHOLD, then the frame is not skipped. Step 222 is executed in which the current value of the register DURATION is set to zero, the frame is played at step 227 and control returns to step 210 to obtain the next frame. If, however, at step 218 the peak amplitude value of frame T is below the threshold value, the method continues to step 224 in which the DURATION count is incremented.

At step 226, the DURATION count is compared to SKIP_VALUE. This value is the number of consecutive frames having peak amplitude values less than the threshold value that must be encountered to skip a frame. At step 226, when the DURATION count is greater than this skip count value, control passes to step 228 where frame T is skipped (i.e. not played), the DURATION and SEARCH_WINDOW registers are reset and control returns to step 210 to get the next audio frame. If, at step 226, the DURATION count is less than the skip count value, the frame is played at step 227 and control returns to step 210.

Adjusting Leading System Time

As mentioned above, if at step 212, the system time is determined to lead the audio time, the method proceeds to step 230 which increments the SEARCH_WINDOW count value. At step 232, the process determines whether the SEARCH_WINDOW count has exceeded SEARCH_WINDOW_MAX. If so, the process could not find a frame suitable for repeating within the allotted time frame. Accordingly, control transfers to step 242 which resets the DURATION and SEARCH_WINDOW count registers and branches to step 212 to repeat the current frame T.

If at step 232, the SEARCH_WINDOW count is less than SEARCH_WINDOW_MAX, the method continues to step 234. At step 234 the peak amplitude value of frame T is compared to the threshold value THRESHOLD. If at step 234 the peak amplitude value of frame T is not less than THRESHOLD, the DURATION count is reset at step 236, the frame is played at step 241 and control returns to step 210 to retrieve the next audio frame from the buffer 20. If at step 240 the level of frame t is less than the value THRESHOLD, the method continues to step 238 which increments the DURATION count.

At step 240, the DURATION count is compared to a REPEAT_VALUE, the preset number of frames having peak amplitude values less than the THRESHOLD value that must occur before a frame can be skipped. If the DURATION count is not less than the REPEAT_VALUE, then the frame is played at step 241 and control returns to step 210 to obtain the next frame. If the DURATION count is greater than or equal to the REPEAT_VALUE, frame T is repeated. This occurs at step 242 which resets the SEARCH_WINDOW and DURATION count values and at step 243 which plays the frame and branches to step 212 so that frame T is processed again.

To further illustrate the method of the present invention, suppose the instruction set of the control unit 55 initializes the registers as follows:

SEARCH_WINDOW_MAX=90
THRESHOLD=128
REPEAT_VALUE =SKIP_VALUE=3

When control unit 55 detects an audio frame that is more than one frame duration out of synchronization with the system time, it writes to the REQ_TO_SKIP or REQ_TO_REP register, as appropriate to initiate the request.

For the next 90 audio frames (approx. 3 seconds), the audio decoder will search for a sequence of three successive audio frames with a peak PCM value less than 128. If it finds that pattern, it skips/repeats the last frame in the sequence.

If, after 90 frames, there have not been 3 successive audio frames (approx. 100 ms) with a peak PCM value less than 128, the audio decoder skips/repeats the frame regardless of its VOLUME value.

Although the variables SKIP_VALUE and REPEAT_VALUE are set to the same value in the example, it is contemplated that they may be set to different values. In addition, it is contemplated that either or both of these values may be set to unity.

The subject invention provides an advantage over existing methods by exploiting silence breaks typically found in movies and television based audio content during conversation, scene changes, and changing between commercials. Because silent intervals of 100 ms or more are common in this type of material, the probability of finding a frame suitable for skipping or repeating is relatively high. The present invention uses a simplified implementation of this probabilistic approach by not requiring extra buffer storage for a non-casual inspection of future audio data. Using this approach, therefore, the probability of a noticeable audio artifact is reduced compared to a decoder that selects an arbitrary audio frame to skip or repeat.

Although illustrated and described above with reference to certain specific embodiments, the present invention is nevertheless not intended to be limited to the details shown. For example, the teachings of the present invention are applicable to any signal in which the synchronization of transmitted frames with respect to a system time. As such, various modifications may be made in the details within the scope and range of equivalents of the claims and without departing from the invention.

What is claimed is:

1. A method of synchronizing an audio frame presentation time with a system time in a MPEG audio bit-stream decoder the audio bit-stream decoder receiving the MPEG audio bit stream as a sequence of audio frames, the method comprising the steps of:

identifying a disparity between a presentation time for one audio frame in the sequence of audio frames and the system time;

responsive to the identified disparity, identify at least one audio frame within a predetermined number of consecutive audio frames in the sequence of audio frames, each of the predetermined number of consecutive audio frames having an amplitudes vaue that is less than a threshold amplitude value; and processing the identified audio frame to reduce the identified disparity between the audio frame presentation time and the system time.

2. A method according to claim 1, wherein:

the step of identifying the disparity between the presentation time and the system time includes identifying the presentation time as lagging the system time by more than a predetermined amount to time; and the step of processing the identified audio frame includes skipping the audio frame in the sequence of audio frames to present a next sequential frame in the sequence of audio frames in place of the identified audio frame.

3. A method according to claim 1, wherein:

the step of identifying the disparity between the presentation time and the system time includes identifying the presentation times as leading the system time by more than a predetermined amount of time; and the step of processing the identified audio frame includes presenting the identified audio frame twice.

4. A method according to claim 1, wherein the step of identifying the at least one audio frame includes the step of identifying a last frame of the predetermined number of consecutive audio frames as the identified audio frame.

5. A method according to claim 1, wherein each audio frame includes a plurality of audio samples and the step of identifying the at least one audio frame includes the steps of:

determining the amplitude value of each audio frame of the predetermine number of consective audio frames as a maximum amplitude value of all the audio samples in the audio frame; and comparing the determined amplitude value to the threshold amplitude value.

6. A method according to claim 1, wherein each audio frame includes a plurality of audio samples and the step of identifying the at least one audio frame includes the steps of:

determining the amplitude value of each audio frame of the predetermined number of consective audio frames as an average amplitude value of all of the audio samples in the audio frame; and comparing the determined amplitude value to the threshold amplitude value.

7. A method according to claim 1, wherein each audio frame includes a plurality of audio samples and the step of identifying the at least one audio frame includes the steps of:

determining the amplitude value of each audio frame of the predetermined number of consecutive audio frames as a root mean square amplitude value of all of the audio samples in the audio frame; and comparing the determined amplitude value to the threshold amplitude value.

8. A method according to claim 1, wherein each audio frame includes a plurality of audio samples, each audio sample having an amplitude value, and the step of identifying the at least one audio frame includes the steps of:

generating a histogram of the amplitude values of the audio samples in each audio frame of the predetermined number of consective audio frames;

determining the amplitude value of each audio frame as the amplitude value that is greater than the amplitude values of a predetermined precentage of the audio samples in the audio frame as determined from the histogram; and comparing the determined amplitude value to the threshold amplitude value.

9. A method according to claim 1, wherein the step of identifying the at least one audio frame includes the steps of:

comparing the amplitude values of group of consective audio frames in the sequence of audio frames to the threshold value;

if a predetermined number of consecutive frames in the group of frames have amplitude values less than the threshold value, selecting a last frame of the predetermined number of frames as the identified audio frame; and if no predetermined number of consective frames in the group of frames have amplitude values less than the threshold value, selecting a last audio frame in the group of consective audio frames as the identified audio frame.

10. A method of synchronizing an audio frame presentation time with a system time in an MPEG audio bit-stream decoder, the audio bit-stream decoder receiving the MPEG audio bit stream as a sequence of audio frames, the method comprising the steps of:

identifying a disparity between a presentation time for one audio frame in the sequence of audio frames and the system time;

responsive to the identified disparity, identifying a group of consecutive audio frames in the sequence of audio frames to be searched; and searching the group of consecutive audio frames for at least one audio frame having an amplitude value that is less than a threshold amplitude value;

if the searching step finds the at least one audio frame having the amplitude value less than the threshold amplitude value, identifying the at least one audio frame as a frame to be process;

if the searching step does not find the at least one audio frame having the amplitude value less than the threshold amplitude value, identifying a last frame in the group of audio frames as the frame to be processed;

processing the identified audio frame to reduce the identified disparity between the audio frame presentation time and the system time.

11. A method according to claim 10, wherein the step of identifying the at least one audio frame includes the step of identifying a plurality of successive audio frames in the group of audio frames each of the plurality of successive audio frames having an amplitude value less than the threshold amplitude value, wherein the identified audio frame is a last frame of the plurality of successive audio frames.

12. A method according to claim 11, wherein:

the step of identifying the disparity between the presentation time and the system time includes identifying the presentation time as lagging the system time by more than a predetermined amount of time; and the step of processing the identified audio frame includes skipping the audio frame in the sequence of audio frames to present a next sequential frame in the sequence of audio frames in place of the identified audio frame.

13. A method according to claim 11, wherein:

the step of identifying the disparity between the presentation time and the system time includes identifying the presentation time as leading the system time by more than a predetermined amount of time; and the step of processing the identified audio frame includes presenting the identified audio frame twice.

14. A method of synchronizing an audio frame presentation time with a system time in an MPEG audio bit-stream, the audio bit-stream decoder receiving the MPEG audio bit stream as a sequence of audio frames, the method comprising the steps of:

comparing the audio frame presentation time of one audio frame in the sequence of audio frames to the system time system time to determine if a disparity exists between the audio frame presentation time and the system time whereby the audio frame presentation time leads the system time or lags the system time by more than a threshold value;

responsive to the identified disparity, identifying a group of consecutive audio frames in the sequence of audio frames to be searched; and searching the group of consecutive audio frames for at least one audio frame having an amplitude value that is less than threshold amplitude value;

if the searching step finds the at least one audio frame having the amplitude value less than the threshold amplitude value, identifying the at least one audio frame as a frame to be processed;

if the searching step does not find the at least one audio frame having the amplitude value less than the threshold amplitude value, identifying a last frame in the group of audio frames as the frame to processed;

processing the identified audio frame to skip the identified audio frame if the audio frame presentation time lags the system time and to repeat the identified audio frame if the audio frame presentation time leads the system time.

15. A method according to claim 14, wherein each audio frame includes a plurality of audio samples and the step of identifying the at least one audio frame includes the steps of:

determining the amplitude value of the audio frame as a maximum amplitude value of all of the audio samples in the audio frame; and comparing the determined amplitude value to the threshold amplitude value.

16. Apparatus for processing an MPEG audio bit stream including a plurality of successive audio frames, selected ones of the audio frames having respective presentation times, to synchronize the audio frame presentation time with a system time, the apparatus comprising:

means for identifying a disparity between a presentation time for one audio frame in the sequence of audio frames and the system time;

means responsive to the identified disparity for identifying at least one audio frame within a predetermined number of consecutive audio frames in the sequence of audio frames, each of the predetermined number of consecutive audio frames having an amplitude value that is less than a threshold amplitude value; and means for processing the identified audio frame to reduce the identified disparity between the audio frame presentation time and the system time.

17. Apparatus according to claim 16, wherein the means for identifying the at least one audio frame includes:

means for selecting a group of consecutive audio frames in the sequence of audio frames;

means for comparing the amplitude values of the group of consecutive audio frames to the threshold value;

means for selecting a last frame of a predetermined number of successive frames as the identified audio frame if the predetermined number of succesive frames in the group of frames have amplitude values less than the threshold value; and means for selecting a last frame of a predetermined number of successive frames as the identified audio frame if the predetermined number of successive frames have amplitude values less than the threshold value.

18. A computer readable carrier including computer program instructions for processing an MPEG audio bit stream including a sequence of audio frames, selected ones of the audio frames having respective presentation times, the computer program instructions implementing a method that controls a computer to synchronize the audio frame presentation time with a system time, the method comprising the steps of:

identifying a disparity between a presentation time for one audio frame in the sequence of audio frames and the system time;

responsive to the identified disparity, identifying at least one audio frame within a predetermined number of consecutive audio frames in the sequence of audio frames, each of the predetermined number of consecutive audio frames having an amplitude value that is less than a threshold amplitude value; and processing the identified audio frame to reduce the identified disparity between the audio frame presentation time and the system time.

19. A computer readable carrier according to claim 18, wherein the computer program instructions that cause the computer to identifying the at least one audio frame includes the steps of:

selecting a group of consecutive audio frames in the sequence of audio frames;

comparing the amplitude values of the group of consecutive audio frames to the threshold value;

selecting a last frame of a predetermined number of successive frames as the identified audio frame if the predetermined number of successive frames in the group of frames have amplitudes values less than the threshold value; and selecting a last audio frame in the group of consecutive audio frames as the identified audio frame if no predetermined number of successive frames in the group of frames have amplitude values less than the threshold value.

* * * * *